United States Patent [19]

Philbert

[11] Patent Number: 4,688,941
[45] Date of Patent: Aug. 25, 1987

[54] DEVICE FOR ANALYZING AND CORRECTING WAVEFRONT SURFACES IN REAL TIME USING A POLARIZATION INTERFEROMETER

[75] Inventor: Michel Philbert, Chatillon, France

[73] Assignee: Office National d'Etudes et de Recherche Aerospatiales (ONERA), Chatillon, France

[21] Appl. No.: 743,609

[22] Filed: Jun. 11, 1985

[30] Foreign Application Priority Data

Jun. 15, 1984 [FR] France .................. 84 09425

[51] Int. Cl.[4] .............................. G01B 9/02
[52] U.S. Cl. ...................... 356/351; 356/353
[58] Field of Search ..................... 356/351, 353; 250/203 R

[56] References Cited

U.S. PATENT DOCUMENTS

| | | | |
|---|---|---|---|
| 3,849,001 | 11/1974 | Inoue et al. | 356/351 X |
| 3,923,400 | 12/1975 | Hardy | 356/353 |
| 4,003,658 | 1/1977 | Kelsall | 250/203 R X |
| 4,072,422 | 2/1978 | Tanaka et al. | 356/351 X |

OTHER PUBLICATIONS

"The Elimination of Signal Fading in Homodyne Interferometric Sensors Using Passive Compensation", Kersey et al., Conference: Collognium on Optical Fiber Sensors, May 1982.

Primary Examiner—Davis L. Willis
Assistant Examiner—S. A. Turner
Attorney, Agent, or Firm—Laubscher & Laubscher

[57] ABSTRACT

An optical system for analyzing and correcting wave fronts comprising a deformable mirror for correcting wave fronts and a system for analyzing and detecting phase distortion, an interferometer with lateral duplication constituting the analysis system, receiving the wave front for analysis and duplicating it and deducing from two neighboring wave fronts obtained signals to control deformation of the deformable mirror, wherein this lateral duplication interferometer is a polarization interferometer consisting of a Wollaston double-refractive biprism with an angle $\theta$, the two prisms being assembled head to tail and cut parallel to the crystallographic axis such that the respective axes are parallel and perpendicular to the edges of the prisms, a polarizer and an analyzer on either side of the biprism and an oscillating optical member on the path of the biprism.

1 Claim, 7 Drawing Figures

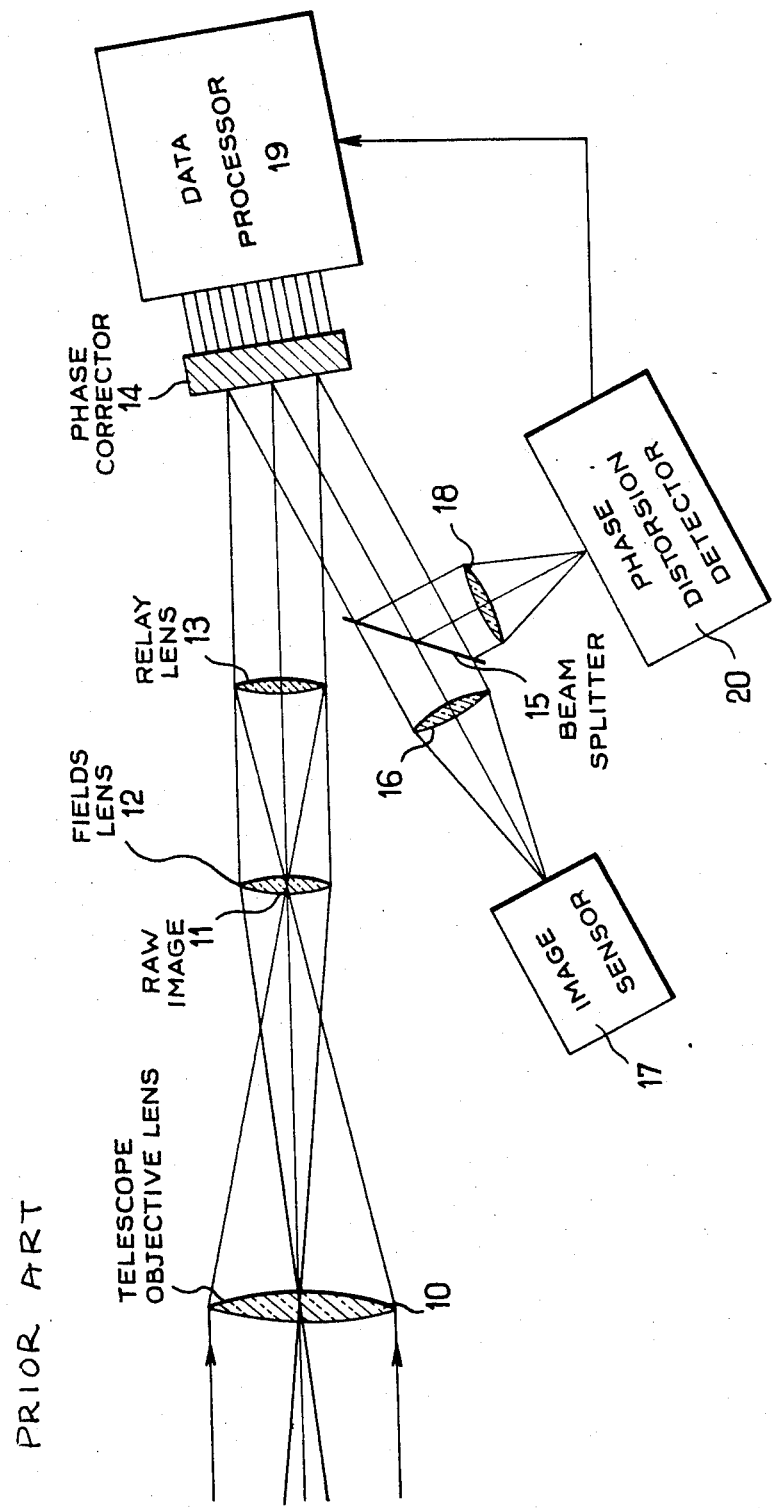
FIG_1 PRIOR ART

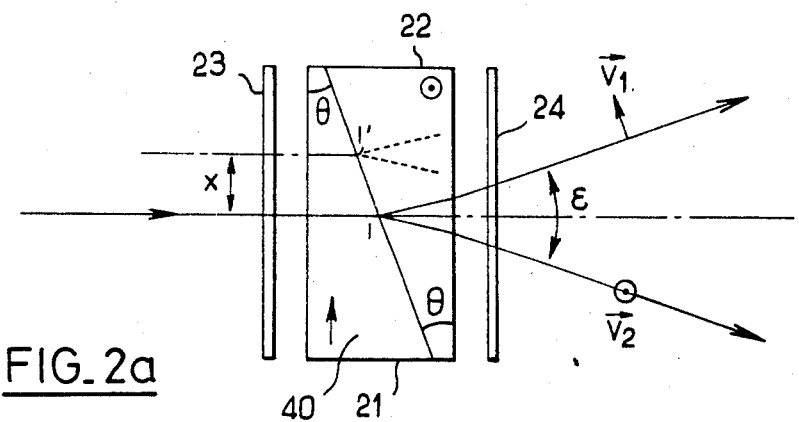
FIG._2a
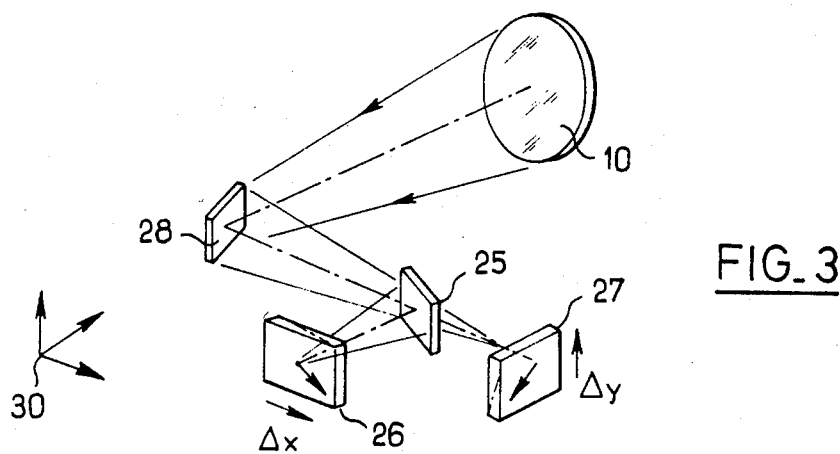
FIG._3
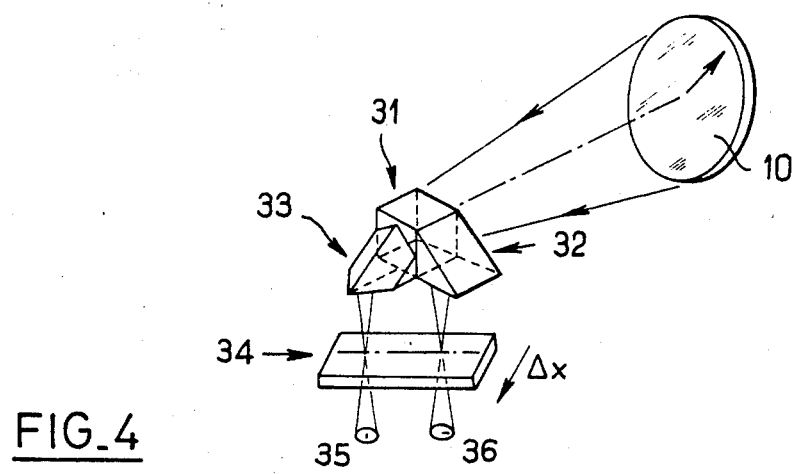
FIG._4

LOCATION OF THE 21
ACTUATORS 51 IN THE
PUPIL PLANE

LOCATION OF THE 16
PHOTODETECTORS IN THE
INTERFERENCE PLANE
(THE SAME FROM $\Delta x$ AND $\Delta y$)

DEVICE FOR ANALYZING AND CORRECTING WAVEFRONT SURFACES IN REAL TIME USING A POLARIZATION INTERFEROMETER

BACKGROUND OF THE INVENTION

1. Field of the invention

The present invention relates, generally speaking, to the analysis and correction of wave surfaces in real time and, more particularly, to a polarization interferometer that serves in measuring the phase distortion of a wavefront.

Wave surface analysis means measurement of the phase differences in the wave delivered by an optical system or instrument with respect to a reference wave surface that would have resulted from the same optical system if assumed to be perfect and unaffected by the atmospheric turbulence.

The wave can be adversely affected by aberrations in the instrument (e.g. in the case of a very large mirror becoming deformed under the effect of various stresses, or a mosaic system made up of multiple mirrors) or by phenomena related to atmospheric propagation (turbulence, thermal defocalization).

The advantage of wavefront analysis in real time is to be able to apply a correction instantaneously to the wave surface using a deformable mirror or, more generally, an adaptive optical system, and thus to free the system of the aforesaid disturbances.

2. Description of the Prior Art

In the current state of the art, wavefront analysis and correction systems working in real time have two types of application both requiring very high spatial resolution (less than or equal to 100 $\mu$rad) : fine aiming for a laser beam and very long range imagery (astronomy, satellite observation). In these applicational fields, the apertures in question are approximately one meter in dimension and the adaptive optical arrangement makes it possible to reach a resolution limit dependent solely on diffraction and no longer on phase defects.

In high-power laser aiming systems based on what are called "return waves", use is made of a wave surface analyzer on the basis of which a deformable mirror is positioned in order to transmit a conjugate wave of the wave received and which focuses perfectly on the target.

As far as very long range optical imagery systems are concerned, it is possible with a wave surface analyzing device to detect phase distortions in the wave front falling on the entrance pupil into the optical system, and a deformable mirror is controlled by the analyzing device in order to correct the wave front for the distortions thus detected.

Optical systems are known especially through patent U.S. Pat. No. 3,923,400 for forming the image of an object through the atmosphere, where such systems comprise a device working in real time for detecting and correcting the phase of the wavefront imaged by these optical systems, the device comprising:

interferometry means based on shearing or lateral duplication receiving the disturbed wavefront, determining the relative phase differences in real time between the various regions in this disturbed wavefront and producing signals representing the phase differences;

means responding to the phase-difference signals for simultaneously producing, in parallel and in real time, signals representing phase corrections to be made to the various regions in the disturbed wavefront in order to obtain a corrected wavefront; and phase correcting means receiving the disturbed wavefront and responding to the phase correcting signals to modify in real time the phase differences between the various regions of the disturbed wave front and charge the shape of this disturbed wave front to generate a corrected wave front.

The purpose of the lateral-duplication interferometer is to duplicate the wavefront to measure the phase difference between the two overlapping regions of the wavefront. To measure this phase difference, at the output from a detector placed in the interference plane, an interference signal is created with modulation thereof obtained by moving one of the portions of the lateral-duplication interferometer.

In the aforesaid patent, the shear interferometer is formed of an optical diffraction grating producing two cones in two slightly divergent angular directions with a common area of overlap. The wavefront is therefore duplicated and it is possible to measure the phase difference between two neighboring areas of the wavefront. This is achieved by modulating the interference pattern and by detecting the relative phase of this interference pattern at various points therein. The use in the aforesaid patent of an interferometer with lateral shear and diffraction grating results in difficulties in tuning the interferometer due to the existence of different diffraction orders within a grating and the need for overlap between just two orders, only 0 and 1 or −1 and 0.

The diffraction gratings in the prior art are moved either in translation or in rotation (cf. "Radial Grating Shear Heterodyne Interferometer", by Chris L. Koliopoulos, Applied Optics, May 1, 1980, vol. 19, no. 9, pages 1523 and sq.) for modulating the interference pattern. The interference in higher orders gives rise to frequency modulations that are multiples of the basic modulation frequency that must be filtered.

At a point in the interference plane, the interference is observed after filtering between the points M(x) and M(x+$\Delta$x) and between M(x) and M(x−$\Delta$x). An exact calculation shows that the phases of these two modulations are identical if the phase shifts (x)−(x+$\Delta$x) and (x−$\Delta$x)−(x) are identical, i.e. if the wave is locally planar, which is something of a hindrance.

SUMMARY OF THE INVENTION

In accordance with the invention, the lateral-duplication interferometer is a polarization interferometer; and wind-tunnel flow display (interferential schlieren techniques).

This type of interferometer consists primarily of a double refracting optical member intended for duplicating the wave surface in two components polarized at ninety degrees; the interference effects between these two waves are revealed by a polarizer and analyzer arranged on either side of the double-refractive system and oriented suitably with respect to the optical axes thereof. This then is the case of a differential interferometer, on the same footing as the lateral-shear interferometer in the aforesaid patent. The difference between the two interferometers lies in that the interference effects are observed in polarized light and not in natural light. By comparison with the device in the aforesaid patent, the polarization interferometer; offers the advantage of reduced dimensions, and greater constructional simplicity but, on the other hand, does not provide the possibility of adjusting at will the off-set between the two wave surfaces. The sensitivity of the device can therefore be modified only through interchanging the double-refractive member.

BRIEF DESCRIPTION OF THE DRAWING

The invention will now be described in detail with reference to the corresponding accompanying drawings in which:

FIG. 1 is an optical diagram showing a wave surface analyzing and correcting device as in the prior art;

FIG. 2a represents a polarization interferometer;

FIG. 3 represents a modulation system for the interferometer with just one oscillating mirror;

FIG. 4 represents a variant of the system for modulating the beams leaving the interferometer;

DESCRIPTION OF THE PREFERRED EMBODIMENTS

Figure 2B:
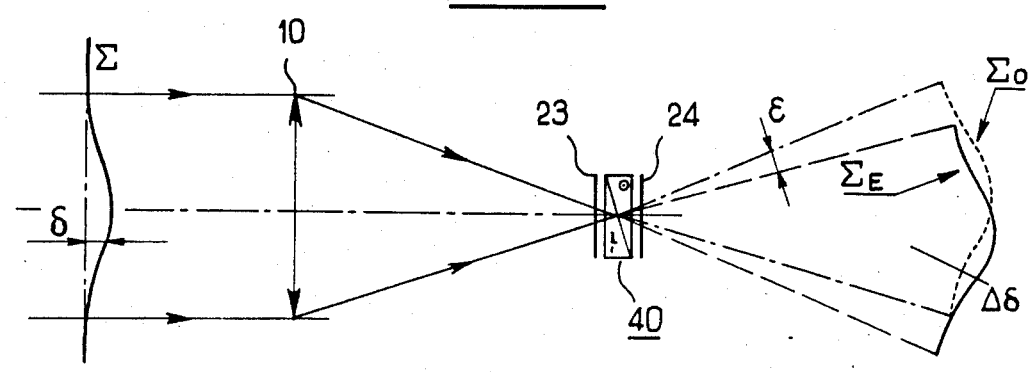
FIG. 2b represents a polarization interferometer, placed at the focal point of a telescope.

With reference to FIG. 1 that recaps on the prior art, depicted is an objective lens 10 on the entrance pupil into a telescopic optical system where the lens delivers an un-corrected image of a distant object in the focal plane 11 of the optical system. This image may be severely distorted as a result of random phase inversions and phase shifts in the wavefront due to atmospheric turbulence or abberations in the optical system.

In FIG. 1, the telescope is used as a refractive optical instrument but, of course, the prior art is valid also for reflective telescopic optical systems. A field lens 12 and a relay lens 13 are associated with the objective 10 to generate an image of the wavefront received by the entrance pupil on a phase correcting device 14 such as a deformable mirror. The wavefront image produced on the phase corrector 14 makes it possible for the latter to modify selectively the phase of the wavefront surface elements. The wavefront is reflected from the surface of the deformable mirror 14 towards a beam splitter 15 that separates the beam into a first beam focused by a lens 16 onto an image detector 17 and a second beam focused by a lens 18 onto a phase distortion detector 20. This phase distortion detector 20 controls the phase correcting device 14 by means of the data processor 19.

The phase correcting device 14 can be a deformable piezoelectrically controlled mirror. The phase distortion detecting device is a shear interferometer which, in the aforesaid U.S. patent, is of the duplicational type with a deffraction grating.

The invention relates to a wave surface analyzing and correcting device in which the interferometer used as a phase distorsion detector 20 is based on polarization techniques.

With reference to FIG. 2a, the polarization interferometer consists of a double-refractive Wollaston biprism 40; it is formed by assembling two quartz prisms 21 and 22 with an angle $\theta$, cut parallel to the crystallographic axis and such that the respective axes are parallel and perpendicular to the edges of the dihedrons. The two prisms are bonded together head to tail thus giving a parallel sided optical system. In practice, use is made of a biprism by interpolating a half-wave plate between the two prisms the axes of which are then arranged mutually parallel. This system provides an increased angular range for the field viewed. The leading property of the device lies in that it causes angular duplication of the incident light beam from the bonding face, whereupon each beam emitted respectively carries an ordinary oscillation $V_1$ contained in the incidence plane and an oscillation $V_2$ contained in the plane perpendicular to the incidence plane.

The angle $\epsilon$ is proportional to the double refraction index $(n_e - n_o)$ of the crystal and to $\tan \theta$:

$$\epsilon = 2(n_e - n_o) \tan \theta$$

(for quartz, $n_e - n_o = 0.0091$).

Furthermore, the phase shift introduced between the two oscillations $V_1$, $V_2$ depends on the position of the point of incidence I on the bonding face: at the medium point of the biprism, the depths through which the beam travels in the two prisms are equal, the phase shifts introduced cancel each other out and the resultant phase shift is zero.

As opposed to this, at a point I' located at a distance x from the median axis, the phase difference between the two oscillations is given by:

$$\Phi = 2k(n_e - n_o)x \tan \theta \quad (k = 2\pi/\lambda)$$

Because the two oscillations transmitted are orthogonal, the interference can be observed only in polarized light; a luminous oscillation oriented at 45° to the biprism crystallographic axes is therefore isolated in the incident beam by means of the polarizer 23 such that the components $V_1$ and $V_2$ have equal amplitudes. This is a necessary condition for achieving maximum contrast between the interference fringes. To view the fringes, an analyzer 24 is placed at the output from the biprism and is oriented at 90° to the incident polarization plane. By focussing on the biprism, a characteristic fringe pattern can then be observed localized on the bonding surface.

FIG. 2b depicts an interferometer such as this located at the focal point of a telescope to analyze a wave surface $\Sigma$. All the light beams from the wave surface $\Sigma$ go through the biprism at a single localized point on the bonding surface such that at the output from the device, the result is two waves $\Sigma_o$ and $\Sigma_e$ polarized at a right angle and duplicated angularly through an angle $\epsilon$.

If the wave surface is free of any deformation and the biprism is positioned at zero phase difference, the two oscillations $V_1$ and $V_2$ are in phase and cancellation is established by the analyzer 24. The pupillary field viewed then appears as being evenly obscure. If on the other hand, the wave surface is deformed, differential discrepancies appear in the phase difference between the two interfering waves $\Sigma_o$ and $\Sigma_e$ as a result of their angular duplication.

These discrepancies cause a partial restoration of the light.

An illustration will now be given of how the wave surface is simultaneously duplicated in two orthogonal directions and how the interferential system is modulated as required for instantaneously measuring the phases, as both these operations are essential for recovery of the overall wave surface in real time.

With reference to FIG. 3, the beam from the telescope objective lens 10 is split into two beams by a semi-transparent plate 25 to cause focussing of one of the beams on the Wollaston 26 for horizontal duplication Δx and the second beam on Wallaston 27 for vertical duplication Δy.

To achieve interferential modulation, it is necessary to communicate a slight periodic displacement of the focused image at the biprism level, in the duplication direction, i.e. horizontally for the Wollaston 26 and vertically for the Wollaston 27. These movements are obtained by using the oscillating mirror 28, with the displacement direction 30 set at 45° to the duplication direction on each of the biprisms. By means of solely an oscillatory movement, the two displacement components required along x and y are thus obtained.

With reference to FIG. 4, the beam from the telescope lens 10 runs through an optical arrangement made up of a semi-transparent cube 31 carrying a totally reflecting prism 32 bonded to one face of the cube and a roof prism 33 bonded to another face. At the output from the device, there are two beams 35 and 36 with pupillary orientations at 90° to each other. By receiving the images focused on a single biprism 34, oriented at 45° to the plane of symmetry, the same phase shift is obtained on both beams, but for pupil images oriented at a right angle. An oscillatory displacement of the biprism then merely has to be impressed on x to give the phase shift in the wave surface along two perpendicular axes.

FIGS. 3 and 4 do not depict the polarizers and analyzer but it is clear that biprism lies between a polarizer and an analyzer.

Figure 5:
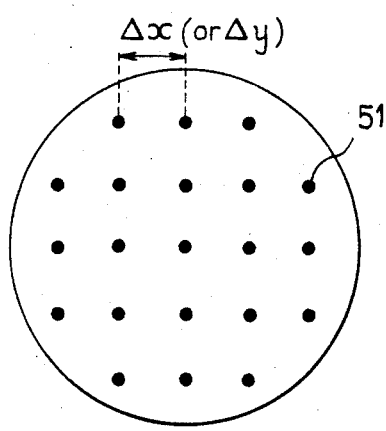
FIG. 5 represents an example of the actuator positions in the pupil.

FIG. 5 depicts the layout of the 21 actuators 51 of the deformable mirror.

Figure 6:
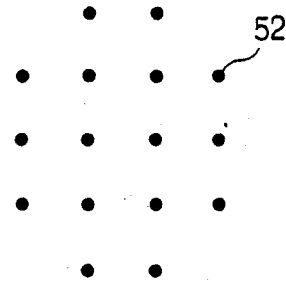
FIG. 6 represents an example corresponding to FIG. 5 showing the position of the photodetector for duplication along both x and y axes.

FIG. 6 shows the layout of the 16 photodectors 51 for measuring the x-wise phase shift and the layout (identical) of the 16 photodetectors 52 for measuring the y-wise phase shift. The data processor 19 computes the values of the activating voltages based on the 2×16 phase shift values along x and y. This computation is carried out as in the prior art, and as a result, processor 19 is not embodied in the present invention.

What I claim is:

1. A device for real time detection and correction of phase distortions in a wavefront being imaged by an optical system, comprising (a) means responsive to phase differences between different areas of the distorted wavefront for simultaneously generating real time phase correction signals indicative of phase corrections for different areas of the distorted wavefront to achieve a corrected wavefront;

(b) phase corrector means having the distorted wavefront incident thereon and being responsive to said phase correction signals for changing real time phase differences between different areas of the distorted wavefront and for changing the shape of the distorted wavefront to achieve the corrected wavefront; and (c) lateral shear interferometer means having the distorted wavefront incident thereon for determining first relative phase differences between different areas of the distorted wavefront aligned along a first direction and second relative phase differences between different areas of the distorted wavefront aligned along a second direction perpendicular to the first direction and for generating signals indicative of said first and second relative phase differences, said lateral shear interferometer means including (1) means for imaging the distorted wavefront through first and second parallel beams in which the wavefront images are oriented along said first and second directions;

(2) a single polarization interferometer including a Wollaston biprism, a polarizer, and an analyzer framing said biprism, said polarization interferometer providing two images of an object angularly shifted and having two perpendicular image orientations;

(3) means for projecting said first and second beams onto said polarization interferometer; and (4) means for vibrating said polarization interferometer, whereby said polarization interferometer produces a first interference pattern having an orientation parallel to the first direction and a second interference pattern having an orientation parallel to the second direction.

* * * * *